UNITED STATES PATENT OFFICE.

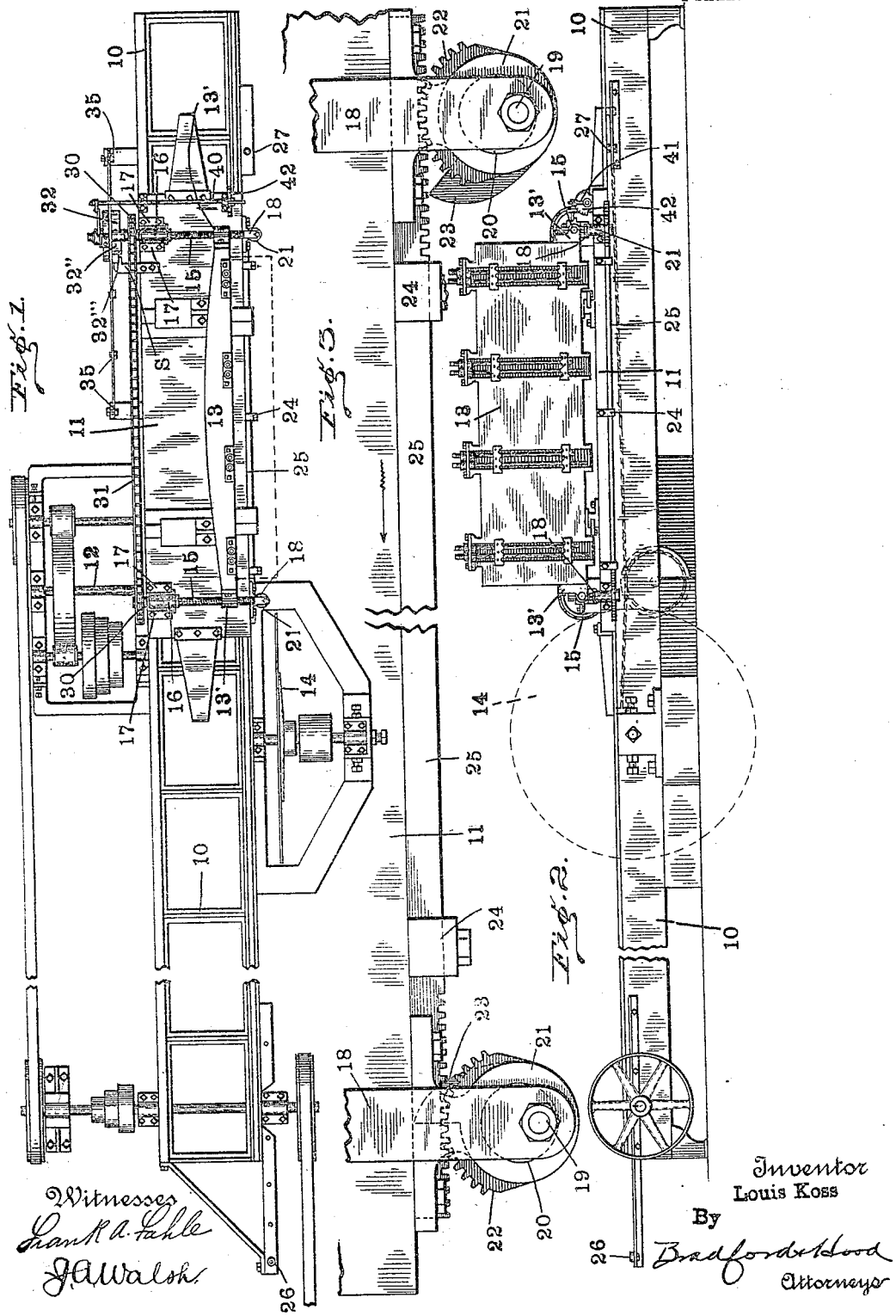

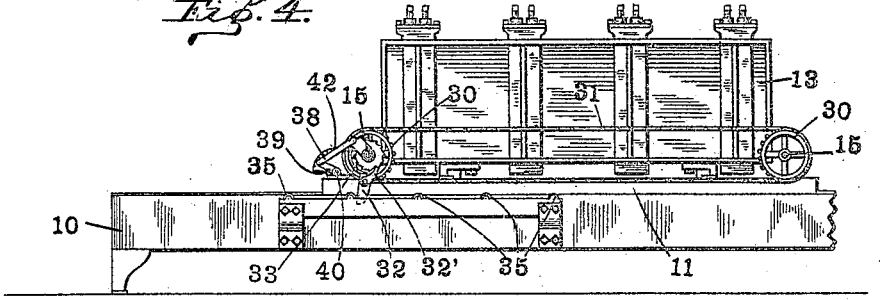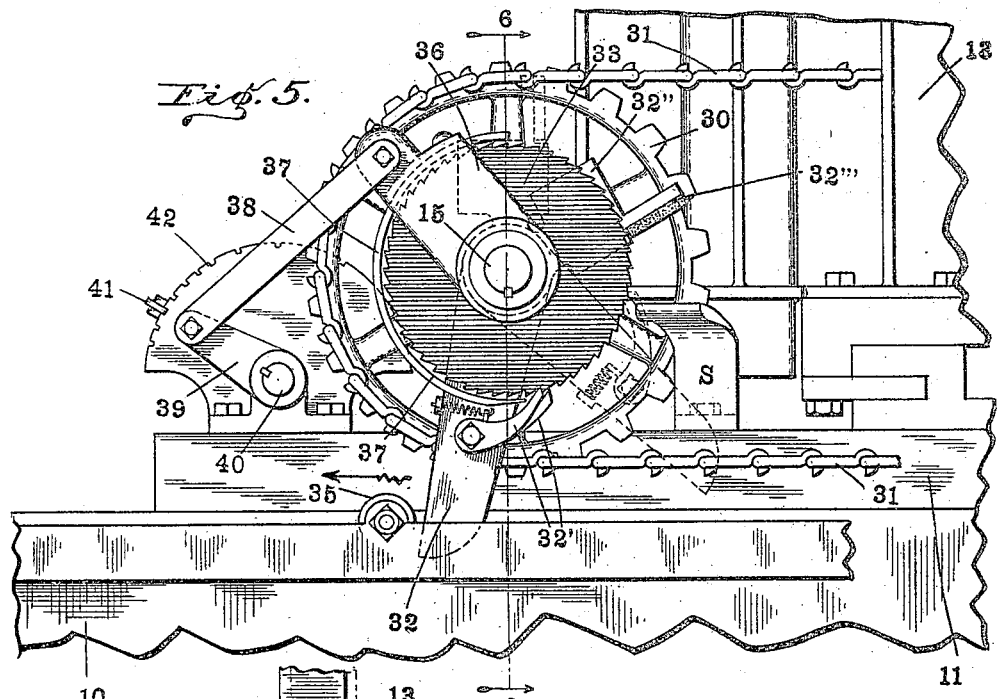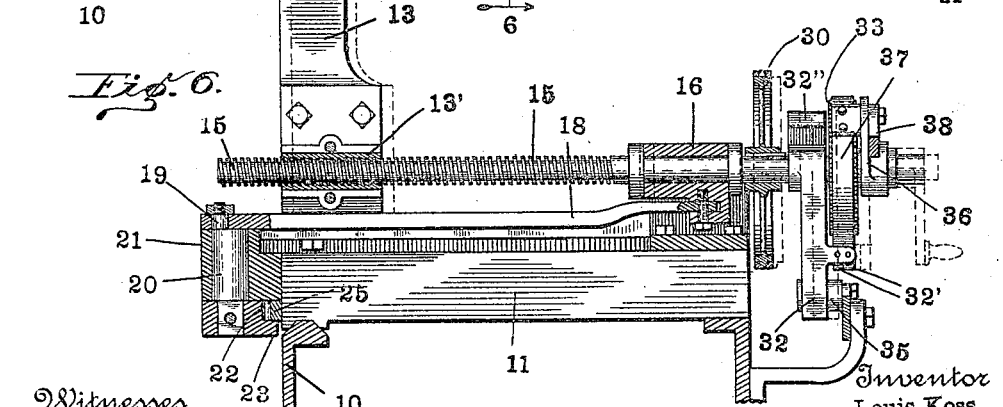

LOUIS KOSS, OF INDIANAPOLIS, INDIANA.

VENEER-CUTTER.

No. 817,784.　　　Specification of Letters Patent.　　　Patented April 17, 1906.

Application filed December 14, 1904. Serial No. 236,788.

*To all whom it may concern:*

Be it known that I, LOUIS KOSS, a citizen of the United States, residing at Indianapolis, in the county of Marion and State of Indiana, have invented certain new and useful Improvements in Veneer-Cutters, of which the following is a specification.

In the ordinary veneer-sawing machine it has heretofore been customary for the operator to manually produce the forward or feeding set of the flitch-head.

The object of my present invention is to provide means for automatically accurately producing this forward or feeding set of the flitch-head, said means being of such character that a wide range of thicknesses of veneers may be produced.

A further object of my invention is to provide a simple yet efficient structure for offsetting the flitch-head for the return stroke of the carriage.

The accompanying drawings illustrate my invention.

Figure 1 is a plan of an apparatus embodying my invention; Fig. 2, a front elevation; Fig. 3, a plan of the offsetting mechanism, on an enlarged scale; Fig. 4, a rear elevation of one end of the machine; Fig. 5, an enlarged rear elevation of parts shown in Fig. 4, and Fig. 6 a section on line 6 6 of Fig 5.

In the drawings, 10 indicates the usual track or supporting-bed upon which the reciprocating flitch-head carriage is mounted in the usual way, said carriage being driven backward and forward by means of a cable, (shown in dotted lines in Fig. 2,) which passes around a drum carried by the reversible drive-shaft 12, driven in any desired manner. Mounted on carriage 11 so as to move transversely thereon on suitable ways is a flitch-head 13, which is provided on its face with any desired flitch-holding means in order that the flitch may be brought into position to be operated upon by the usual saw 14. The construction thus far described is of common and ordinary form.

Threaded through suitable boxes 13' of the flitch-head 13 are screw-rods 15, which rods are arranged one at each end of the flitch-head 13. Each of the rods 15 is journaled in a boxing 16, which is slidably mounted in suitable guides 17, carried by the carriage 11, the arrangement being such that the boxing 16 may have a limited movement transversely of the carriage 11 toward and from the plane of the saw, said boxing carrying with it the threaded rod 15, which is journaled therein. Pivoted to each box 16 is one end of a link 18, the opposite end of which is journaled upon an eccentric wrist-pin 19, carried by a vertical shaft 20, journaled in a bearing 21, carried by the carriage 11. Each shaft 20 has attached to its lower end a segmental gear 22 and a cam-finger 23. Slidably mounted in suitable ways 24 on carriage 11 so as to slide in a line parallel with the line of movement of said carriage is a rack-bar 25, the opposite ends of which are provided with suitable teeth, which mesh with the segmental gears 22, the arrangement being such that when the carriage 11 reaches the farther end of its travel to the left in Fig. 1 the cam-finger 23 of the adjacent shaft 20 will come into contact with a pin or roller 26, so as to turn segment 22 clockwise, Fig. 3, thus shifting rack-bar 25 and causing a similar clockwise movement of the segment 22 at the opposite end of the carriage. The simultaneous movement of the two segments 22 causes a simultaneous turning of the shafts 20 and a consequent simultaneous movement of the wrist-pins 19, so as to simultaneously slide the blocks 16, and thus retract the threaded rods 15, and consequently the connected flitch-head 13 to the position indicated in dotted lines in Fig. 6. As a consequence when the carriage 11 is returned to the opposite or right-hand end of the bed, Fig. 1, the flitch has been set back sufficiently to clear the saw 14 and also to permit the feeding set of the head, which takes place during the return movement of the carriage.

When the carriage reaches the right-hand end of the bed, Fig. 1, the adjacent cam-finger 23, (the right-hand cam-finger, Fig. 3,) which has been moved by the movement previously described so as to occupy a position similar to that occupied by the left-hand cam-finger 23 in Fig. 3, comes into engagement with a pin or roller 27, thus causing a movement of the shafts 20 in a counter-clockwise direction, so as to move the flitch-head 13 toward the plane of the saw an amount equal to the amount which it has been previously retracted.

In present constructions hand-operated means is provided by which the operator may rotate the screw-rods 15, so as to advance the flitch-head toward the plane of the saw the desired amount to produce a desired thickness of veneer, and it has been necessary to accomplish this movement after the carriage has been returned to its first position and while the carriage remains stationary, so that there was necessarily a considerable loss of time.

In my present construction I have provided means for automatically setting the flitch-carriage forward an amount to produce the next cut of veneer while the carriage is returning to initial position, this movement being wholly independent of the setback construction already described. For this purpose I attach to each shaft 15 a sprocket-wheel 30, and these sprocket-wheels are connected by a chain 31. Journaled upon one of the shafts 15 is a pawl-arm 32, carrying pawls 32', adapted to engage a ratchet-wheel 33, secured to the said screw-rod 15. The pawl-arm 32 is provided with a counterbalance 32" in order that it may normally occupy the position shown in Fig. 5. A spring may be substituted for the counterbalance if quicker return is desired. As the carriage 11 moves on its return stroke in the direction indicated by the arrow in Fig. 5 the pawl-arm 32 is brought into successive engagement with one or more rollers or pins 35, which will thus cause successive swingings of the pawl-arm 32 to the position indicated in dotted lines in Fig. 5, thus simultaneously turning the screw-rods 15 and advancing the flitch-head 13 a predetermined amount, so that when the setback mechanism is returned at the end of the return stroke of the carriage the flitch-head will occupy a position nearer the plane of the saw an amount equal to the desired veneer plus the saw-kerf. In order to increase the amount of this forward movement, any desired number of pins or rollers 35 may be provided, as shown in Figs. 1 and 4, so as to cause successive reciprocations of the pawl-lever 32.

Thus far the construction described will be such as to permit only adjustment of forward setting in multiples of the amount produced by a single swing of the pawl-lever 32, and in order to increase the range of this mechanism I journal upon the rod 15 an arm 36, which carries a semi-annular shield 37, the forward end of which may be projected into the path of movement of the pawls 32', so as to shield the ratchet-wheel 33 during a portion of the movement of the pawls. The shield 37 may be operated by means of a link 38, arm 39, shaft 40, and operating-arm 41, which last-mentioned arm operates in conjunction with a notched segment 42, by means of which the shielding action of the shield 37 may be accurately determined. On the forward movement of the carriage 11 the pawl-arm 32 will ride over the rollers 35 and the pawls 32' will ride back over the shield 37 without producing any effect on the ratchet-wheel, a buffer-arm 31" engaging a stop-arm S to prevent bouncing of the pawl-lever.

The shield 37 may be readily adjusted during operation of the machine, so that if the veneer is found to be running either thick or thin the proper gage can be produced without stopping.

The rods 15 may be turned by hand by means of a hand-crank. (Shown in dotted lines in Fig. 6.)

I claim as my invention—

1. In a veneer-machine, the combination, with the cutter, the flitch-carriage, and means for moving one with relation to the other, of a flitch-head carried by the carriage and transversely movable thereon toward and from the plane of the cutter, a pair of screw-rods engaging said flitch-head, journal-blocks for said screw-rods mounted in suitable ways on the carriage and movable toward and from the plane of the cutter, a pair of shafts journaled on the carriage substantially at right angles to the screws and each provided with an eccentric portion, a direct connection between each of said eccentric portions and one of the journal-blocks, a pair of links between said eccentric portions and the journal-blocks, a segmental gear carried by each of said shafts, a rack-bar mounted on the carriage and connecting the two segmental gears, operating means carried by each of said shafts, and means dependent upon the relative movement between the carriage and cutter for alternately engaging said operating means, for the purpose set forth.

2. In a veneer-machine, the combination, with a cutter, and a flitch-head mounted on said carriage and movable toward and from the plane of the cutter, a pair of screw-rods journaled on the carriage and engaging the flitch-head, intermediate connections between the screw-rods for simultaneous movement thereof, a ratchet-wheel carried by one of said screw-rods, a pawl-arm carried by the carriage and provided with pawls adapted to engage said ratchet-wheel, means carried by the frame for engaging said pawl-arm, a shield shielding a portion of said ratchet, and means for readily and accurately adjusting said shield with relation to the path of travel of the pawls during operation.

3. In a veneer-machine, the combination, with a cutter and a flitch-carriage, of means for moving one with relation to the other in a plane parallel therewith, setback means for moving one transversely to the other, feeding means for moving one transversely with relation to the other in opposition to the setback means, means dependent upon the relative movement between the cutter and flitch-carriage in the cutting plane for automatically operating the setback means, means dependent upon the relative movement between the cutter and flitch-carriage in the cutting plane for automatically operating the feeding means, means operable at all times for varying the action of the operating means on the feeding means, and means for accurately gaging the position of said varying means at all times.

4. In a veneer-sawing machine, the combination, with a saw and a flitch-carriage, of setback means for moving one transversely with relation to the other for the return stroke of the carriage, feeding means for moving one with relation to the other in opposition to the setback means during the return stroke of the carriage, means dependent upon the movement of the flitch-carriage for automatically operating the setback means, means dependent upon the movement of the flitch-carriage for automatically operating the feeding means, means operable at all times for varying the action of said automatic means on the feeding means, and means for accurately gaging and maintaining the position of said varying means at all times.

In witness whereof I have hereunto set my hand and seal at Indianapolis, Indiana, this 6th day of December, A. D. 1904.

LOUIS KOSS. [L. s.]

Witnesses
    ARTHUR M. HOOD,
    JAMES A. WALSH.